Dec. 9, 1952 — S. ERIKSEN ET AL — 2,620,796
PELLET INJECTOR
Filed March 6, 1950 — 2 SHEETS—SHEET 1
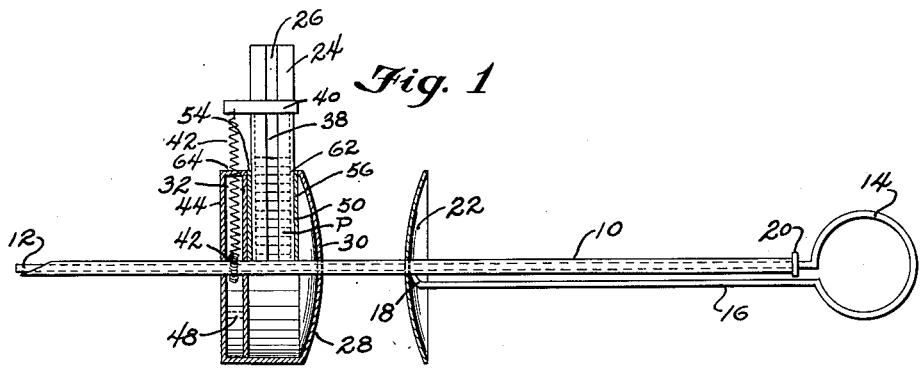
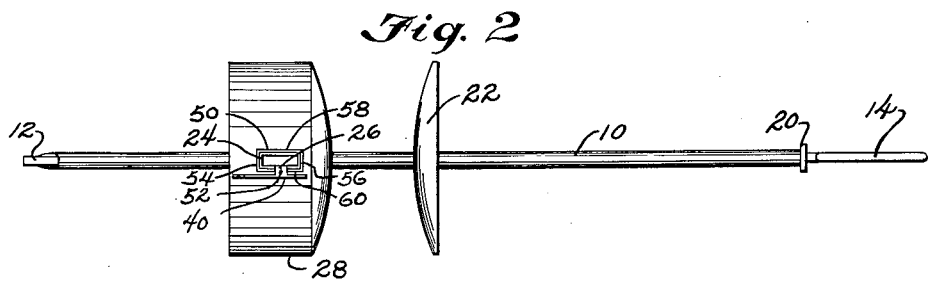
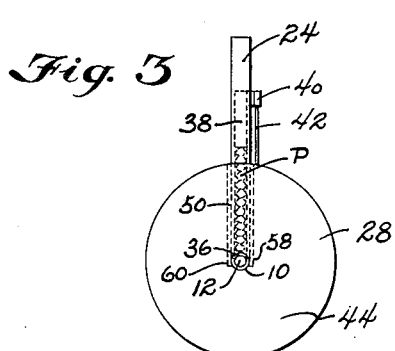
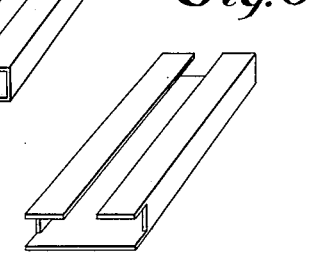
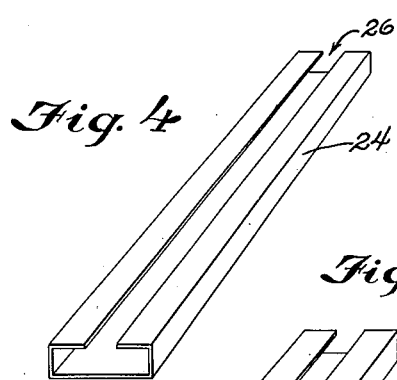
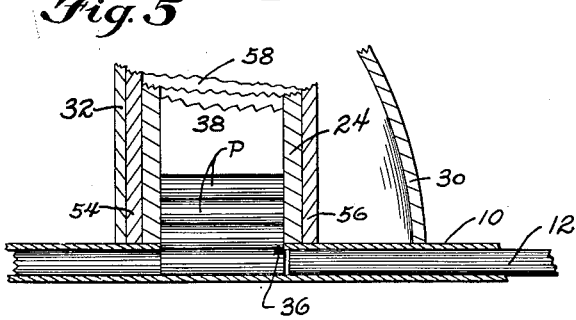
INVENTORS
SIVERT ERIKSEN
HUBERT D. WHITE
BY Joseph G. Werner
ATTORNEY Dec. 9, 1952  S. ERIKSEN ET AL  2,620,796
PELLET INJECTOR
Filed March 6, 1950  2 SHEETS—SHEET 2
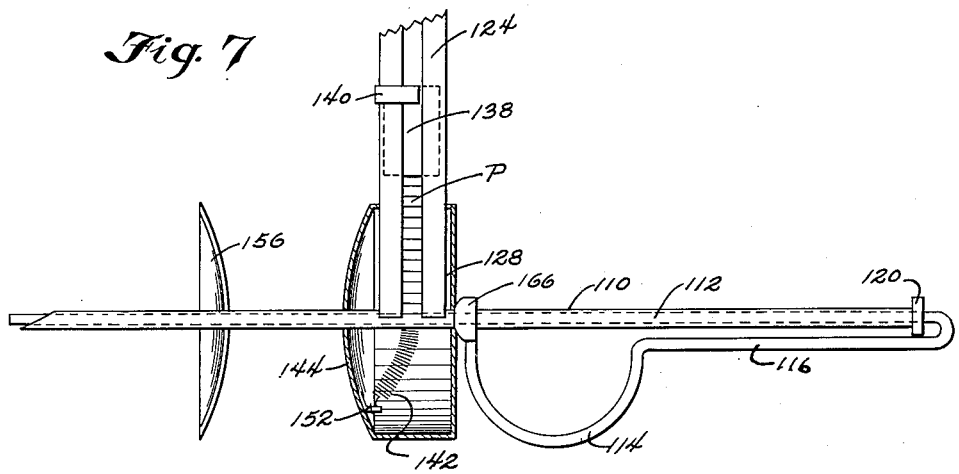
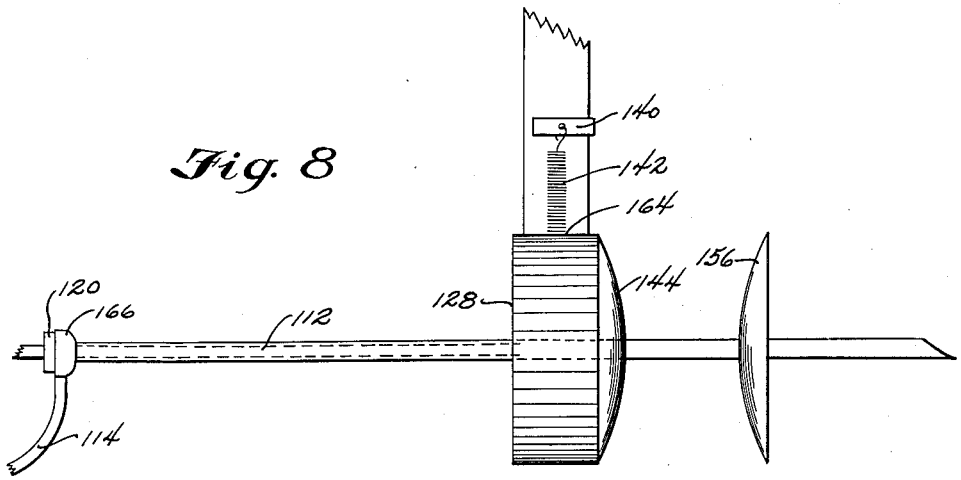
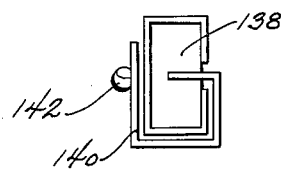
INVENTORS
SIVERT ERIKSEN
HUBERT D. WHITE
BY Joseph G. Werner
ATTORNEY Patented Dec. 9, 1952

2,620,796

UNITED STATES PATENT OFFICE 2,620,796

PELLET INJECTOR

Sivert Eriksen and Hubert D. White, Madison, Wis., assignors to American Scientific Laboratories, Inc., Madison, Wis., a corporation of Wisconsin Application March 6, 1950, Serial No. 147,944

13 Claims. (Cl. 128—217)

This invention relates to improvements in pellet injectors adapted to implant or to inject subcutaneously or otherwise any desired biological or chemical substance, in pellet or tablet form, in animals or poultry.

It is an object of the invention to provide a pellet injector which may be associated with a cartridge clip of a plurality of pellets which may be successively fed into the device positively and forcibly and successively ejected while the device is held in any position.

Another object is to provide an injector which requires no particular skill to operate and which may be held and actuated by one hand of the operator leaving the other hand free to hold the fowl or animal in the position desired.

An additional object is to provide a pellet injector which will become locked when the pellets are exhausted or when the device is unloaded thereby warning the operator when reloading of pellets is required.

It is a further object to provide a pellet injector which will permit the use of cylindrical-shaped pellets thereby giving adequate dosage through a smaller opening in the skin of the animal or fowl than where round pellets of equal dosage are used, but is not limited to the use of cylindrical-shaped pellets.

Another object is to provide a pellet injector which permits the needle to be inserted under the skin and positioned for implantation of the pellet before the injector is loaded for operation, thereby avoiding loss of pellets during the process of insertion and assuring proper injection of the pellets under the skin.

A further object is to provide a pellet injector which is extremely simple and inexpensive in construction and durable in operation.

Other objects and advantages of the invention will be apparent from the following detailed description taken in conjunction with the accompanying drawings wherein a preferred embodiment of the principles of the invention has been selected for exemplification.

In the drawings:

Fig. 1 is a side elevational view of a pellet injector constructed in accordance with one form of the present invention and showing the pellet supporting chamber in vertical section;

Fig. 2 is a plan view of the device shown in Fig. 1;

Fig. 3 is a front end view of the device shown in Figs. 1 and 2;

Fig. 4 is a perspective view of the pellet containing clip;

Fig. 5 is an enlarged detail view in vertical section through the barrel and pellet containing clip showing the manner of feeding successive pellets to the barrel;

Fig. 6 is a perspective view of the clip holder;

Fig. 7 is a side elevational view of another form of the invention and showing the pellet supporting chamber in vertical section;

Fig. 8 is another side elevational view of the device shown in Fig. 7; and

Fig. 9 is a plan view of the pellet containing clip better to show the follower block and spring attachment of the device shown in Figs. 7 and 8.

Referring more particularly to the drawings, wherein like numerals refer to like parts, the device as shown comprises an elongated hollow barrel 10 terminating in a bevelled forward end which for most purposes will have sharpened edges. A plunger 12 is slidably supported within the barrel 10 for longitudinal movement within the limits of a rearward or retracted position for receiving a pellet load and a forward position where the plunger clears the bevelled end of the barrel for ejecting the pellet.

For actuating the plunger 12, a loop or handle 14 is provided at the end of the plunger projecting rearwardly of the barrel 10. In the preferred construction shown in Figures 1 and 2, the handle 14 may be an integral extension of the plunger 12 bent in the form of a loop of a size sufficient to receive the operator's thumb and having a forwardly bent portion forming a stem 16 extending along the side of the barrel and terminating in a pin 18 bent inwardly toward the barrel. The purpose of the stem 16 and pin 18 is to limit the sliding movement of the plunger 12. To this end, an annular rib 20 is provided at the rearward end of the barrel 10 against which the pin 18 will abut to limit the rearward or retracted position of the plunger and disc member 22 extends circumferentially outwardly of an intermediate portion of the barrel 10 for engagement with the pin 18 to limit the forward or ejecting position of the plunger. As shown, the disc 22 is preferably of sufficient size to provide a rest for the operator's middle finger and index finger and is so disposed with respect to the loop 14 that the device may be readily actuated and controlled with one hand.

Pellets indicated at P are adapted to be fed to the device from a clip 24 of channel shaped configuration having an open slot 26 through which the supply of pellets may be viewed. For supporting the clip 24 in operative position relative to the barrel 10, a clip holder 50 of channel shaped configuration is provided, having an open slot 52 and parallel side walls 54 and 56 and opposite parallel side walls 58 and 60, within which clip 24 may be slidably mounted. A chamber 28, extending circumferentially outwardly of barrel 10, is provided on the barrel, said chamber having forward wall 44, inner partition wall 32, and rearward wall 30 which is in spaced relationship to disc 22 to accommodate the operator's middle and index fingers between wall 30 and disc 22. Disc 22 and wall 30 may be oppositely dished or curved to engage fingers of different sizes. The back side of the fingers rest against wall 30 permitting the operator better to retract the plunger with his thumb and enabling an efficient and steady operation of the device.

Clip holder 50 is positioned over aperture 36 of barrel 10, with wall 54 attached to inner partition wall 32 and the lower ends of walls 58 and 60 extending over and attached to the outer wall of barrel 10. Clip holder 50 extends upward to the outer periphery of chamber 28 through aperture 62. When clip 24 is mounted in clip holder 50 the lower edges of the clip rest upon the edges of barrel 10 at aperture 36, thereby preventing the clip from extending into barrel 10. Clip 24 thus communicates with the barrel 10 through aperture 36 provided in the barrel wall through which the pellets are fed.

For forcibly discharging the pellets P from the clip 24 into the barrel 10 a follower block 38 is received within the clip to bear against the uppermost pellet and is urged downwardly by an arm 40 extending laterally from a coil spring 42. Spring 42 extends downwardly through an aperture 64 of chamber 28 and has its opposite end attached to barrel 10, or to rod 48 shown by dotted lines extended between walls 32 and 44, and is slidably supported between walls 32 and 44 of the chamber 28. The arrangement is such that after the last pellet from the clip 24 has been fed to the barrel 10 and ejected therefrom, the follower block 38 will enter the barrel 10 so as to lock the plunger 12 in retracted position, thus indicating that the supply of pellets is exhausted. The arrangement further permits the operator to see the pellets in clip 24 drop down as each pellet becomes seated in the barrel to assure him that the device has been loaded.

In a modified form as shown in Fig. 7 the clip 124 may be permanently attached to the barrel 110 and inner chamber 50 thereby omitted.

As a further modification, a coil spring 142 as illustrated by Figs. 7 and 8 may be used. The lower end of the coil spring may be held by flange 152 extending from the inner side of forward wall 144 of chamber 128. Chamber 128 is apertured at 164 to permit the coil spring to be extended vertically to U-shaped arm 140, to which is attached follower block 138.

In the modification shown in Figs. 7 and 8 the outer side of wall 144 of chamber 128 may be dished or curved as a rest for the operator's middle finger and index finger. Forwardly disposed of wall 144 of chamber 128 is a disc member 156, which may be oppositely dished or curved, extending laterally outwardly of an intermediate portion of barrel 110, in spaced relationship with wall 144 of chamber 128 to engage the middle and index fingers of the operator. In such modified form the plunger 112 may be extended rearwardly of barrel 110 and forwardly bent to form a stem 116 extending along the side of the barrel 110, and enlarged at the forward end in the form of a handle 114 of a sufficient size to receive the operator's thumb and terminating in a loop or eye 166 extending annularly around barrel 110. Annular rib 120 is provided at the rearward end of barrel 110 to limit the rearward movement of plunger 112 when eye 166 abuts against such annular rib.

The operation of the device described will be readily apparent. With a pellet-containing clip 24 positioned as shown and with the follower block 38 inserted at the top of the clip and bearing against the uppermost pellet, the operator has merely to grasp the instrument with an index and middle finger between the disc 22 and wall 28, and thumb through the loop 14 and thence by backward pressure of the thumb the forward end of plunger 12 may be retracted beyond the aperture 36 to permit a pellet to be forced into the barrel 10. Forward pressure of the thumb will urge the plunger 12 forwardly to eject the pellet and at the same time seal the aperture 36 until retracted in repetition of the cycle. By the use of force instead of gravity feed the device may be used with equal effectiveness in any position. Clip 24 may be removed from inner chamber 50, upon disengagement of follower block 38 and arm 40, to facilitate the loading of the pellets.

It is an important feature of the invention to prevent loss of pellets and to assure proper implantation by retracting the plunger just enough to clear the bevelled point of the barrel under the skin of the fowl or animal preparatory to implantation. The plunger is then retracted to its limit to permit loading of a pellet into the barrel and then pressed forward to implant the pellet. By such operation the pellet cannot drop out of the instrument before the barrel is inserted under the skin and the operator is assured that the pellet has been implanted under the skin.

In the operation of the modified form shown in Figs. 7 and 8, the operator places an index finger and middle finger between the front wall 144 of chamber 128 and disc 156 and his thumb through the handle 114. By backward pressure of the thumb, plunger 112 is retracted permitting a pellet to be forced into barrel 110. The rearward motion of plunger 112 is limited by annular rib 120, and the forward motion of the plunger is limited by loop 166 striking against the rearward side of chamber 128.

It will be understood that the present invention is not confined to the precise construction and arrangement of parts as herein illustrated and described but embraces all modifications thereof within the scope of the following claims.

What we claim is:

1. A pellet injector comprising, an elongated barrel, supporting means on said barrel for a plurality of pellets, a spring pressed follower carried by said supporting means for successively feeding pellets through an aperture into said barrel, a plunger slidable in said barrel beyond said aperture for ejecting pellets fed to the barrel, said plunger having an extension thereof projecting outwardly of the rear of said barrel and reversely bent to lie alongside the exterior of said barrel, the said plunger extension having a portion bent in the form of a handle and carrying at its free end an abutment for engagement with spaced projections extending outwardly of said barrel for limiting the path of movement of the plunger.

2. A pellet injector comprising, an elongated barrel, supporting means on said barrel for a plurality of pellets, a spring pressed follower carried by said supporting means for successively feeding said pellets through an aperture into said barrel, said follower being adapted to enter said barrel to provide a signal when the supply of pellets is exhausted, a plunger slidable in said barrel beyond said aperture for ejecting pellets fed to the barrel, said plunger having an extension thereof projecting outwardly of the rear of said barrel and formed as a handle for actuating said plunger.

3. A pellet injector comprising, an elongated barrel, supporting means on said barrel for a plurality of pellets, a spring pressed follower carried by said supporting means for successively feeding said pellets through an aperture into said barrel, said follower being adapted to enter said barrel to provide a signal when the supply of pellets is exhausted, a plunger slidable in said barrel beyond said aperture for ejecting pellets fed to the barrel, said plunger having a rearwardly extending portion projecting outwardly of said barrel and formed as a handle for actuating the plunger.

4. The device of claim 3 wherein the extended portion of the plunger is additionally provided with a stem extending forwardly of the handle beside the barrel for engagement with projections carried by the barrel for limiting the path of movement of the plunger.

5. An injector including a barrel and a plunger slidable longitudinally of said barrel, the said plunger having an end projecting rearwardly of said barrel, a handle on said projecting end of said plunger, a stem carried by said handle and extending forwardly exteriorly of said barrel, a laterally disposed pin carried by the forward extremity of said stem and spaced means provided on said barrel engageable with said pin to limit the sliding movement of said plunger relative to said barrel.

6. The device of claim 5 wherein one of said spaced means carried by said barrel is a disc extending radially outwardly of the barrel a substantial distance to form a finger rest for use simultaneously with said handle.

7. The device of claim 5 wherein one of said spaced means carried by said barrel is a disc extending radially outwardly of the barrel a substantial distance with means carried by said barrel spaced forward of said disc to form a finger rest between said disc and said means for use simultaneously with said handle.

8. An injector including a barrel and a plunger slidable longitudinally of said barrel, the said plunger having an end projecting rearwardly of said barrel, the projecting end of said plunger being bent into a loop to form a handle and having the free end portion thereof forwardly bent in a line substantially parallel with said barrel and terminating in a laterally disposed pin and means carried by said barrel and spaced along the length thereof engageable with said pin to limit the sliding movement of said plunger relative to said barrel.

9. The device of claim 8 wherein one of said spaced means carried by said barrel is a disc extending radially outwardly of the barrel a substantial distance to form a finger rest for use simultaneously with said handle.

10. The device of claim 8 wherein one of said spaced means carried by said barrel is a disc extending radially outwardly of the barrel a substantial distance with means carried by said barrel spaced forward of said disc to form a finger rest between said disc and said means for use simultaneously with said handle.

11. An injector including a barrel and a plunger slidable longitudinally of said barrel, the said plunger having an end projecting rearwardly of said barrel, a stem carried by said projecting end of said plunger and extending forwardly exteriorly of said barrel, a handle carried by the forward extremity of said stem, an eye carried by the forward extremity of said handle extending circumferentially around said barrel and spaced means provided on said barrel engageable with said eye to limit the sliding movement of said plunger relative to said barrel.

12. A pellet injector comprising, an elongated barrel, supporting means on said barrel for a plurality of pellets, a spring pressed follower carried by said supporting means for successively feeding said pellets through an aperture into said barrel, a plunger slidable in said barrel beyond said aperture for ejecting pellets fed to the barrel, said plunger having a rearwardly extending portion projecting outwardly of said barrel with a stem extending forwardly exteriorly of said barrel and formed as a handle for actuating the plunger, the said forwardly extending portion of said handle extending circumferentially around the barrel for engagement with projections carried by the barrel for limiting the path of movement of the plunger.

13. The device of claim 12 wherein spaced forwardly of said supporting means carried by said barrel for said pellets is a disc extending circumferentially of the barrel to form a finger rest between said disc and said supporting means for use simultaneously with said handle.

SIVERT ERIKSEN.
HUBERT D. WHITE.

REFERENCES CITED

The following references are of record in the file of this patent:

UNITED STATES PATENTS

| Number | Name | Date |
| --- | --- | --- |
| 834,261 | Chambers | Oct. 30, 1906 |
| 1,347,622 | Deininger | July 27, 1920 |

FOREIGN PATENTS

| Number | Country | Date |
| --- | --- | --- |
| 35 | Great Britain | Oct. 1, 1852 |
| 1,190 | Great Britain | Jan. 18, 1895 |
| 472,560 | Great Britain | Sept. 27, 1937 |